United States Patent
Cho et al.

(10) Patent No.: US 7,965,931 B2
(45) Date of Patent: Jun. 21, 2011

(54) SYSTEM AND METHOD FOR CORRECTING LIGHT PATHWAY BY DRIVING CURVED PRISM COMPOSED OF REFRACTION SURFACE

(75) Inventors: Woo Jong Cho, Gyeonggi-do (KR); Sung Mun Cho, Suwon-si (KR); Seong Deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 404 days.

(21) Appl. No.: 12/037,251

(22) Filed: Feb. 26, 2008

(65) Prior Publication Data

US 2009/0067051 A1    Mar. 12, 2009

(30) Foreign Application Priority Data

Sep. 12, 2007    (KR) .................. 10-2007-0092485

(51) Int. Cl.
    *G03B 17/00*    (2006.01)
    *G02B 26/08*    (2006.01)
(52) U.S. Cl. ... 396/55; 359/221.2; 359/557; 348/208.11
(58) Field of Classification Search ............... 396/55; 348/208.11; 359/196.1, 221.2, 226.2, 432, 359/554, 557, 837
    See application file for complete search history.

(56) References Cited

U.S. PATENT DOCUMENTS

| 7,454,130 B2* | 11/2008 | Chang | 396/55 |
| 2006/0092524 A1* | 5/2006 | Konno | 359/678 |
| 2006/0262193 A1* | 11/2006 | Kumaki | 348/208.6 |
| 2007/0009244 A1* | 1/2007 | Takahashi | 396/55 |

FOREIGN PATENT DOCUMENTS

| JP | 10-020191 | 1/1998 |
| JP | 2003-185924 | 7/2003 |
| JP | 2006-058363 | 3/2006 |
| JP | 2006-133281 | 5/2006 |
| JP | 2006-162933 | 6/2006 |

* cited by examiner

*Primary Examiner* — Clayton E Laballe
*Assistant Examiner* — Autumn Parker
(74) *Attorney, Agent, or Firm* — Staas & Halsey LLP

(57) ABSTRACT

A system and method of correcting a light pathway is provided. A system for correcting a light pathway, the system including: a light pathway change amount measurement unit to measure a light pathway change amount using a movement amount of an image when a light pathway of incident light is changed due to shaking of a camera; and a curved prism driving unit to drive a curved prism, composed of a refraction surface, based on a light pathway correction amount determined by the light pathway change amount.

20 Claims, 7 Drawing Sheets

FIG. 5
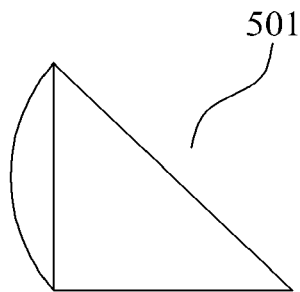
501
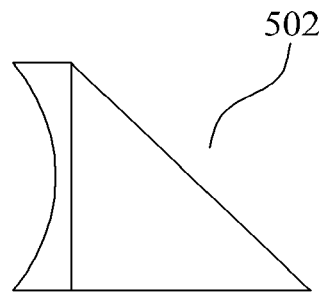
502
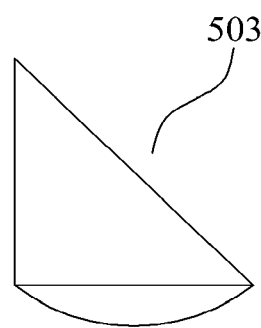
503
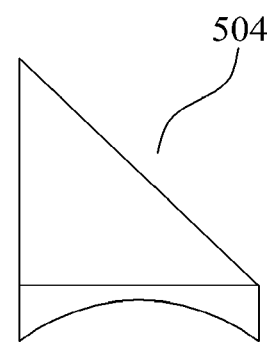
504
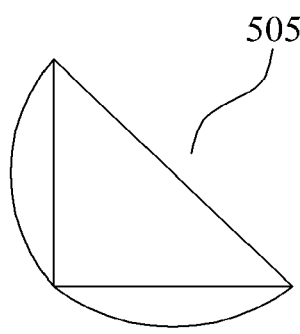
505
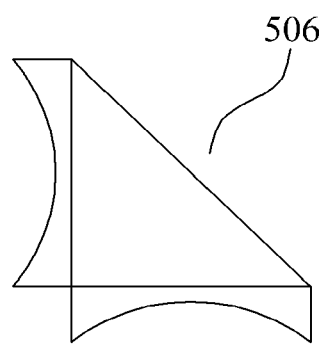
506
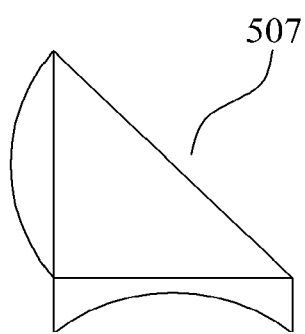
507
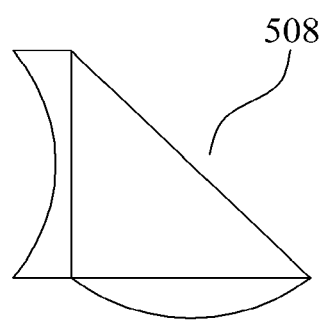
508

FIG. 6
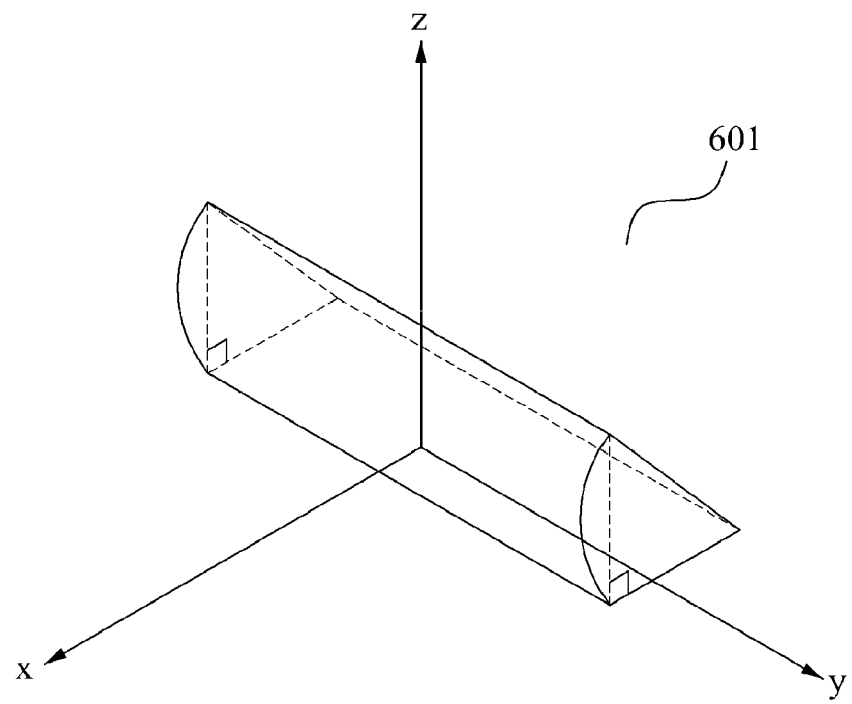
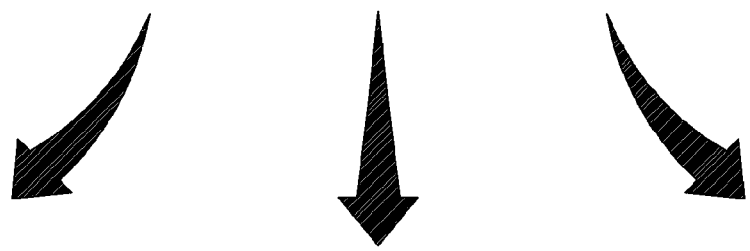
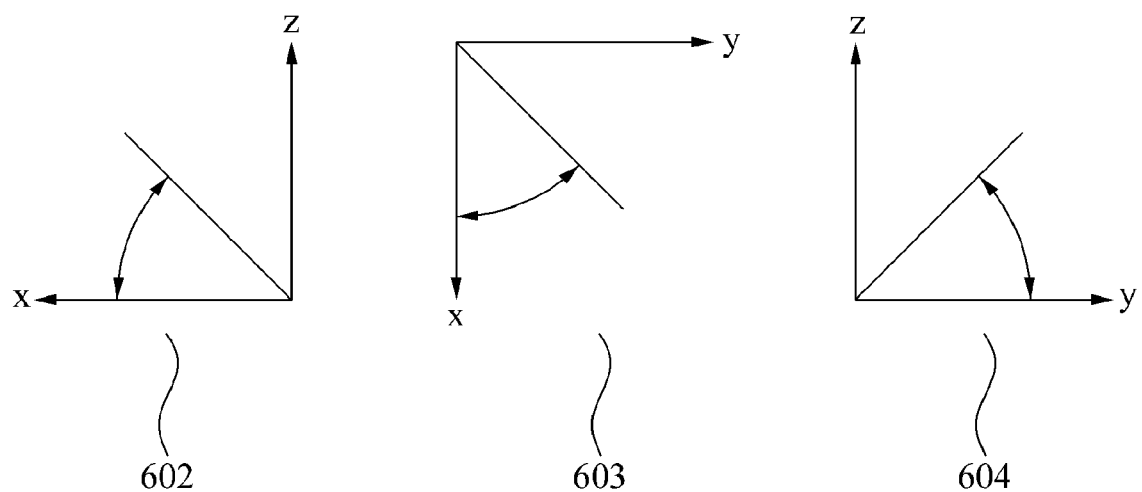

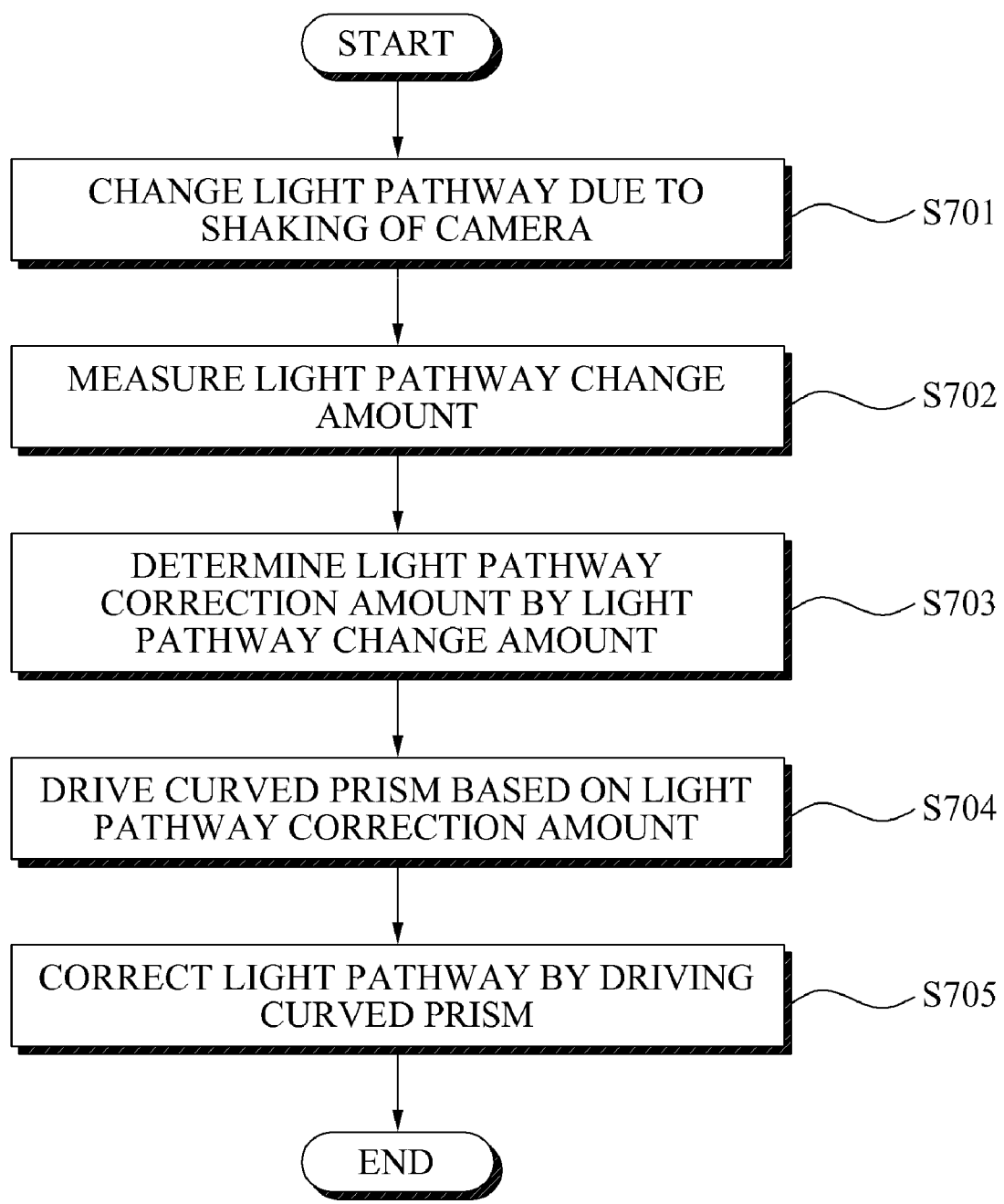

SYSTEM AND METHOD FOR CORRECTING LIGHT PATHWAY BY DRIVING CURVED PRISM COMPOSED OF REFRACTION SURFACE

CROSS-REFERENCE TO RELATED APPLICATION

This application claims the benefit of Korean Patent Application No. 2007-92485, filed on Sep. 12, 2007 in the Korean Intellectual Property Office, the disclosure of which is incorporated herein by reference.

BACKGROUND OF THE INVENTION

1. Field of the Invention

Aspects of the present invention relate to a system and method of correcting a light pathway, and more particularly, to a system and method of correcting a light pathway which can correct a light pathway change generated due to shaking of a camera by driving a curved prism composed of a refraction surface.

2. Description of the Related Art

Recently, a camera module mounted in a portable device such as a digital camera and a cellular phone has been gradually minimized and thinned due to consumers' desires. Also, a camera module having a high-power zoom lens has appeared. Since the high-power zoom lens is introduced, a problem of compensating for hand trembling within a telescopic range has recently become a big issue.

A curve-type zoom lens may be applied to a zoom lens for a slim-type camera and a cellular phone. When a series-type zoom lens is applied, a length of a barrel increases. Accordingly, it is difficult to slim a camera and the like.

The curve-type zoom lens expresses an image by enabling incident light to reach an image sensor using a total reflection effect of a curved prism included within a lens barrel. When a zoom magnification is increased, the curve-type zoom lens reaches the telescopic range. The curve-type zoom lens having reached the telescopic range can react to minute shaking more easily than a wide angle area. Specifically, the image expressed by the curve-type zoom lens may be blurry due to the minute shaking.

A general cause of shaking of the camera is hand trembling. Accordingly, when a light pathway difference of incident light emitted from an object for photography is generated, the image expressed using the image sensor can be blurry. Various conventional methods of correcting hand trembling exist in order to solve a blur phenomenon of the image due to hand trembling.

For example, there are an Optical Image Stabilizer (OIS), an Electrical Image Stabilizer (EIS), a Digital Image Stabilizer (DIS), and the like, as methods of correcting hand trembling. The OIS can be the most effective method of correcting hand trembling. Generally, when the OIS is used, it is known that the OIS can eliminate 80% to 95% of hand trembling.

The OIS of correcting hand trembling is specifically classified into an active prism method, a lens shift method, a sensor movement method, and the like. However, since the OIS has a problem that a thickness and a length of the barrel of the zoom lens increase, the OIS cannot be applied to the slim-type device.

Specifically, due to adding an active prism of the active prism method, the thickness of the lens barrel increases. Also, the lens shift method has a problem that an internal structure of the lens barrel becomes complex due to additionally needing a component for moving the lens. Also, the sensor movement method has a problem that the thickness of the lens barrel increases due to adding a necessary component for moving the image sensor.

Accordingly, a technology of correcting shaking of the camera due to hand trembling and the like without an additional optical component in order to be easily applied to the slim-type device is needed.

SUMMARY OF THE INVENTION

Aspects of the present invention provide a method and system for correcting a light pathway which can correct a light pathway change generated due to shaking of a camera by driving a curved prism composed of a refraction surface.

Aspects of the present invention provide a method and system for correcting a light pathway which can easily eliminate arbitrary shaking of a camera by driving a curved prism composed of a refraction surface using various methods.

Aspects of the present invention provide a method and system for correcting a light pathway which can eliminate a need for increasing a length and a thickness of a zoom lens barrel caused by adding parts by composing a curved prism of a refraction surface performing an object lens function.

Aspects of the present invention provide a method and system for correcting a light pathway which can eliminate various shakings of a camera by driving a curved prism composed of various refraction surfaces.

Aspects of the present invention provide a method and system for correcting a light pathway by driving a curved prism composed of a refraction surface which can reduce an assembling error of an additional optical apparatus needed for the correcting of the light pathway.

According to an aspect of the present invention, there is provided a system for correcting a light pathway, the system including: a light pathway change amount measurement unit to measure a light pathway change amount using a movement amount of an image when a light pathway of incident light is changed due to shaking of a camera; and a curved prism driving unit to drive a curved prism, composed of a refraction surface, based on a light pathway correction amount determined by the light pathway change amount.

In this instance, at least one of an incident surface and an exit surface of the curved prism is composed of a refraction surface having a curvature.

In this instance, at least one of an incident surface and an exit surface of the curved prism is composed of an aspherical surface.

In this instance, an object lens including the refraction surface is connected with at least one of an incident surface and an exit surface of the curved prism.

In this instance, the curved prism driving unit rotates the curved prism in any one of a pitch direction, a yaw direction, and a roll direction based on the light pathway correction amount.

According to another aspect of the present invention, there is provided a method of correcting a light pathway, the method including: measuring a light pathway change amount using a movement amount of an image when a light pathway of incident light is changed due to shaking of a camera; and driving a curved prism, composed of a refraction surface, based on a light pathway correction amount determined by the light pathway change amount.

In this instance, the measuring calculates a zoom magnification using location information of a zoom lens included within the camera, and measures the light pathway change amount using the zoom magnification.

In this instance, the driving drives the curved prism in a direction which decreases the light pathway change amount based on the light pathway correction amount.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 illustrates an example of a curved prism connected with an object lens composed of a refraction surface according to an embodiment of the present invention;

FIG. 6 illustrates an example of a rotation direction for a curved prism according to an embodiment of the present invention; and FIG. 7 is a flowchart illustrating a method of correcting a light pathway according to an embodiment of the present invention.

DETAILED DESCRIPTION OF EMBODIMENTS

Figure 1:
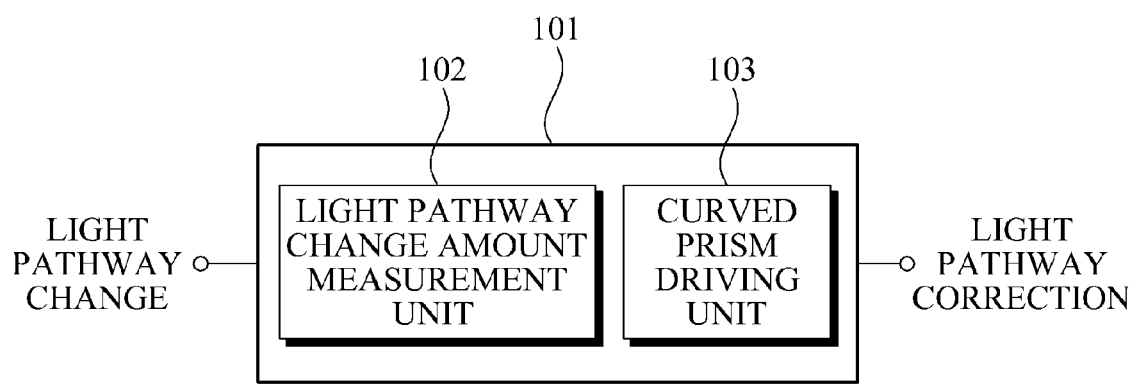
FIG. 1 is a block diagram illustrating a system for correcting a light pathway according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating a system 101 for correcting a light pathway according to an embodiment of the present invention.

Referring to FIG. 1, the system 101 for correcting the light pathway according to the present embodiment of the present invention includes a light pathway change amount measurement unit 102 and a curved prism driving unit 103.

The light pathway change amount measurement unit 102 can measure a light pathway change amount of incident light generated due to shaking of a camera. In this instance, when a light pathway difference of incident light is generated due to shaking of the camera, an image expressed in an image sensor via a lens barrel is blurry. Accordingly, the light pathway change amount measurement unit 102 can measure the light pathway change amount using a blur degree of the image expressed in the image sensor.

Specifically, when there is no shaking of the camera, the image expressed in the image sensor is a static state, however, when shaking of the camera is generated, the image expressed in the image sensor appears to be moving. Accordingly, the light pathway change amount measurement unit 102 can measure the light pathway change amount by calculating a movement amount of the image due to shaking of the camera using an angular velocity of two axial directions.

As described above, shaking of the camera is generally generated due to hand trembling. Specifically, shaking of the camera can be generated due to minute hand trembling when photographing. In this instance, shaking of the camera can be shown in a vibration form. A vibration frequency due to hand trembling is generally accepted as 4 Hz to 20 Hz, and a vibration direction is arbitrary. When the lens barrel is rotated upward due to shaking of the camera, incident light is relatively incident downward.

When the light pathway difference of incident light exists due to shaking of the camera, the image expressed in the image sensor is blurry. Accordingly, the light pathway change amount measurement unit 102 can measure the light pathway change amount by calculating the degree of blur of the image expressed in the image sensor. A specific operation of the light pathway change amount measurement unit 102 is described in detail with reference to FIG. 3.

The curved prism driving unit 103 can drive a curved prism, composed of a refraction surface, based on a light pathway correction amount determined by the measured light pathway change amount. Driving the curved prism denotes moving the curved prism.

The curved prism of the present invention can transmit incident light to the image sensor by totally reflecting incident light. Specifically, incident light incident on the lens barrel passes through an incident surface of the curved prism, and the passed incident light is reflected on a total reflection surface of the curved prism and reaches the image sensor via an exit surface.

When the curved prism is used, a thickness of the lens barrel can be thinly manufactured due to the above-described feature. Accordingly, the curved prism can be included within the barrel of a curve-type zoom lens generally applied to a slim-type device.

For example, the curved prism driving unit 103 enables the curved prism to move upward and downward, or right and left, or to rotate, or to move on an arbitrary curve. In this instance, the curved prism driving unit 103 drives the curved prism in a direction which decreases the light pathway change amount. In this instance, the curved prism driving unit 103 rotates the curved prism in any one of a pitch direction, a yaw direction, and a roll direction. Accordingly, when the curved prism is driven, the light pathway of incident light changed due to shaking of the camera can be corrected into the same light pathway as when no shaking of the camera occurs.

As an example, at least one of an incident surface and an exit surface of the curved prism is composed of a refraction surface having a curvature. As another example, at least one of an incident surface and an exit surface of the curved prism is composed of an aspherical surface. Here, the aspherical surface denotes a refraction surface having imperfect sphere.

In this instance, the refraction surface having the curvature can be any one of a convex surface having a plus refractive index and a concave surface having a minus refractive index. Since incident light passing through the convex surface is refracted and is converged into a specific focus, the convex surface has the plus refractive index. Conversely, since incident light passing through the concave surface is refracted and is diverged, the concave surface has the minus refractive index.

Also, for example, an object lens including the refraction surface is connected with at least one of an incident surface and an exit surface of the curved prism. Also, the object lens including the refraction surface being the aspherical surface is connected with at least one of an incident surface and an exit surface of the curved prism.

Accordingly, the curved prism itself can have the refraction surface, or the curved prism can be connected with the object lens including the refraction surface. Specifically, the curved prism denotes an object for performing a function of the object lens using the composed refraction surface.

Therefore, according to the present invention, there is an advantage which a number of optical parts needed for correcting the light pathway with the refraction surface composing the curved prism can be reduced. Also, since the number of optical parts is reduced, an assembling error, which is generated when the optical parts are assembled, can be reduced. Also, according to the present invention, the curved prism also performs the function of the object lens, thereby solving a spherical aberration problem which is generated by the object lens separately mounted in the lens barrel in a conventional light pathway correction scheme. A specific operation of the curved prism driving unit 103 is described in detail with reference to FIG. 3.

Figure 2:
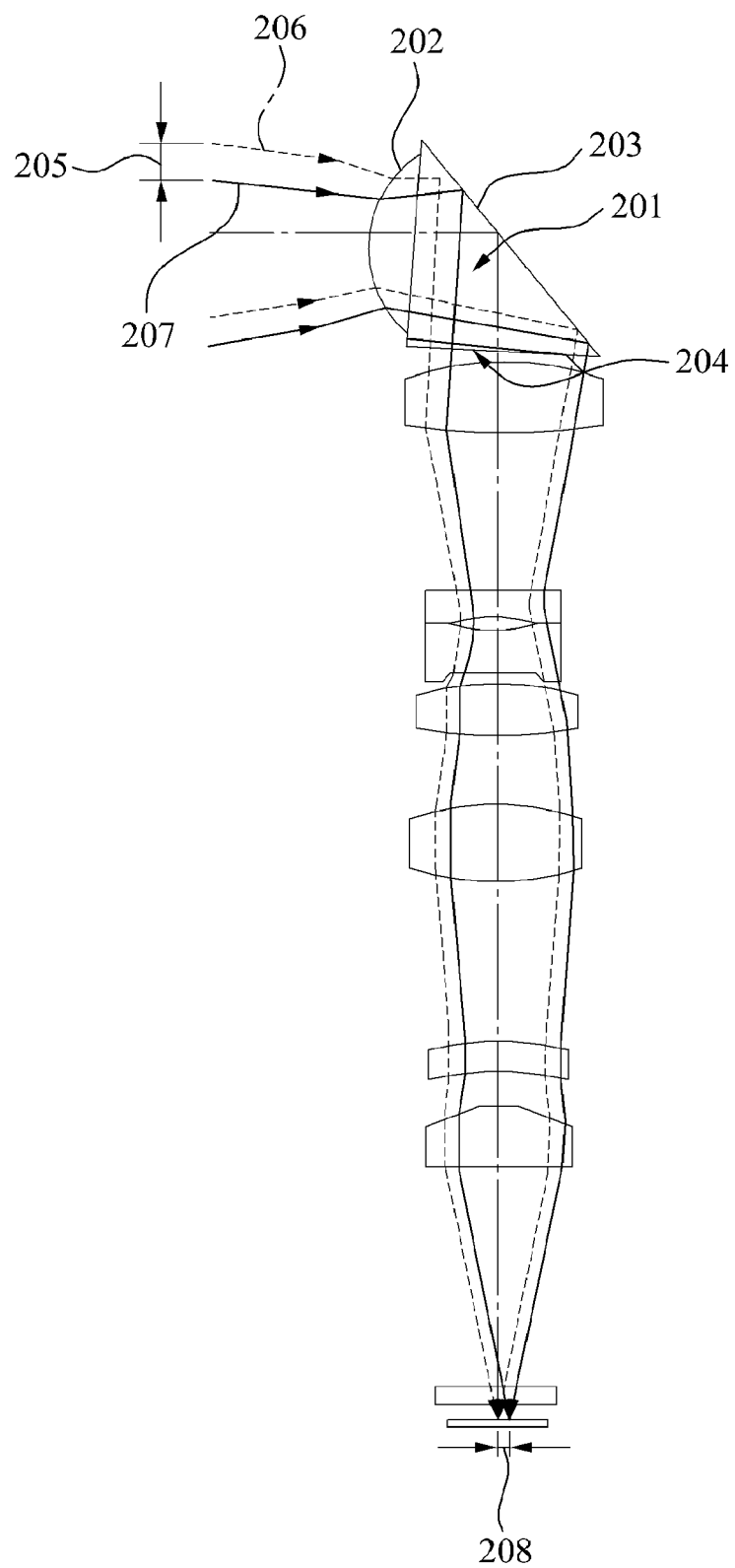
FIG. 2 illustrates a process during which a blur of an image in an image sensor is generated due to a light pathway difference of incident light.

FIG. 2 illustrates a process during which a blur of an image in an image sensor is generated due to a light pathway difference of incident light.

Referring to FIG. 2, a light pathway change generated due to shaking of a camera is shown. FIG. 2 illustrates a barrel structure of a curve-type zoom lens included within the camera. A curved prism 201 included in the curve-type zoom lens can include an incident surface 202, a total reflection surface 203, and an exit surface 204.

The curve-type zoom lens using the curved prism 201 different from a conventional series-type zoom lens is useful for slimming the camera. When incident light passes through the incident surface 202, the incident light is totally reflected on the total reflection surface 203 and is bent at a 90° angle. The totally reflected incident light can pass through the exit surface 204 and reach the image sensor. Accordingly, incident light having reached the image sensor can be converted and be expressed in the image. Incident light can pass through various lenses until incident light reaches the image sensor.

As illustrated in FIG. 2, various lenses for controlling a zoom of a lens and eliminating a spherical aberration, a color aberration, and the like can exist within a lens barrel. Also, the various lenses of FIG. 2 are examples, and the lenses can be variously determined based on a type of the camera.

When shaking of the camera is generated, a light pathway difference 205 of incident light being incident on the curve-type zoom lens can be generated. The light pathway difference 205 denotes a difference between first incident light 206 being incident on the zoom lens barrel when shaking of the camera exists, and second incident light 207 being incident on the zoom lens barrel when shaking of the camera does not exist.

Incident light in which the light pathway difference 205 exists reaches the image sensor via various lenses included in the zoom lens barrel. The image expressed using the image sensor is moved due to the light pathway difference 205 generated due to shaking of the camera, and a movement amount 208 of the image exists. Edges included in an outputted image can be blurry due to the movement amount 208.

As described above, the light pathway change amount can be measured using the movement amount 208 of the image expressed in the image sensor. Specifically, when shaking of the camera is generated during photographing when using the camera (when a camera shutter is opened), the image expressed in the image sensor appears to be moving, and the Edges included in an outputted image can be blurry.

For example, the movement amount 208 of the image can be calculated using an angular velocity of two axial directions. For example, the movement amount 208 of the image can be sensed using a gyro sensor. Specifically, the light pathway change amount measurement unit 102 of FIG. 1 measures the movement amount 208 of the image expressed in the image sensor using an angular velocity of two axial directions. Also, the light pathway change amount measurement unit 102 converts the calculated angular velocity into a digital signal, and measures the light pathway change amount by integrating the converted digital signal.

For example, the light pathway change amount measurement unit 102 calculates a zoom magnification using location information of a zoom lens included within the lens barrel, and measures the light pathway change amount using the calculated zoom magnification, since the light pathway change amount can be changed based on the zoom magnification. In this instance, the location information of the zoom lens can be determined by a location sensor. For example, the location sensor includes a Magneto-Resistive (MR) sensor. The light pathway change amount can be expressed in an angle and a frequency of shaking of the camera. For example, the light pathway change amount can be expressed in an angle and a frequency of shaking of the camera at 1° and 17 Hz, respectively.

Figure 3:
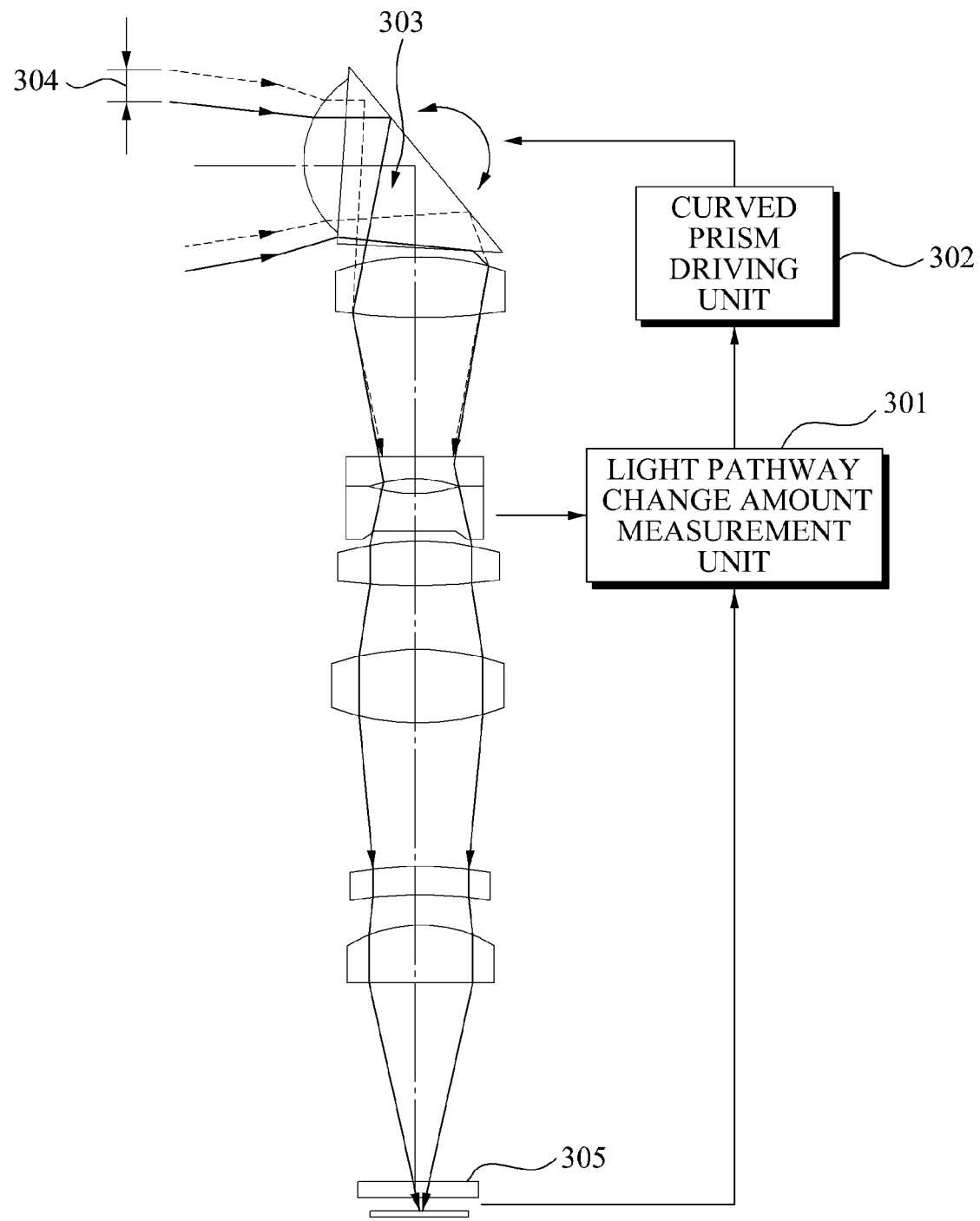
FIG. 3 illustrates a process of correcting a light pathway change by driving a curved prism composed of a refraction surface using a system for correcting a light pathway according to an embodiment of the present invention.

FIG. 3 illustrates a process of correcting a light pathway change by driving a curved prism composed of a refraction surface using a system for correcting a light pathway according to an embodiment of the present invention.

A light pathway change amount measurement unit 301 measures a movement amount of an image expressed in an image sensor using acceleration in two axial directions. Also, the light pathway change amount measurement unit 301 converts a calculated angular velocity into a digital signal, and measures the light pathway change amount by integrating the converted digital signal. Also, the light pathway change amount measurement unit 301 calculates a zoom magnification using location information of a zoom lens included within the camera, and measures the light pathway change amount using the zoom magnification.

A curved prism driving unit 302 can drive a curved prism 303, composed of a refraction surface, based on a light pathway correction amount determined by the measured light pathway change amount. In this instance, the light pathway correction amount includes a movement angle and a movement direction of the curved prism.

For example, the curved prism driving unit 302 drives the curved prism 303 in a direction which decreases the light pathway change amount based on the light pathway correction amount. In this instance, the curved prism driving unit 302 rotates the curved prism 303 in any one of a pitch direction, a yaw direction, and a roll direction based on the light pathway correction amount.

At least one of an incident surface and an exit surface of the curved prism 303 is composed of a refraction surface having a curvature, or is composed of a refraction surface being an aspherical surface having no curvature. Also, an object lens having the curvature is connected with at least one of the incident surface and the exit surface of the curved prism 303, or the object lens of the aspherical surface having no curvature is connected with at least one of the incident surface and the exit surface of the curved prism 303.

For example, as illustrated in FIG. 3, a convex lens is connected with the incident surface of the curved prism 303. When incident light in which the light pathway is changed due to shaking of the camera is incident, incident light is refracted using the convex lens connected with the incident surface, and the refracted incident light is reflected on a total reflection surface and reaches the image sensor.

The present invention can exclude a separate convex lens from the lens barrel in order to perform a refraction function, and use at least one of the curved prism 303 composed of the refraction surface, and the curved prism 303 of which at least one of the incident surface and the exit surface is connected with the object lens. Specifically, the present invention does not separately include the object lens in the zoom lens barrel, and composes the curved prism 303 of the refraction surface performing an object lens function.

When a number of lenses increases within the lens barrel, a thickness of the lens barrel can increase. Also, when the object lens separately exists, the curved prism 303 and the object lens are needed to be separately driven, and accurately correcting the light pathway becomes difficult. Accordingly, when the curved prism described in the present invention is used, the above-described problem can be solved.

An example of the curved prism having the refraction surface is described in detail with reference to FIGS. 4 and 5.

As described above, the curved prism driving unit 302 can drive the curved prism 303. For example, the curved prism driving unit 302 can drive the curved prism 303 using a Piezoactuator (PZT), a Voice Coil Motor (VCM), an Ultra Sonic Motor (USM), a Direct Current (DC) motor, a stepping motor, and a servo motor. The above-described motors are examples, and a motor is not limited thereto.

The curved prism driving unit 302 rotates the curved prism 303 in any one of a pitch direction, a yaw direction, and a roll direction using the above-described motors and the like. Accordingly, a light pathway difference 304 generated due to shaking of the camera is reduced by a rotation of the curved prism 303, and the light pathway can be corrected.

The rotation of the curved prism 303 can be determined by the light pathway correction amount. As described above, the light pathway correction amount includes a movement angle and a movement direction of the curved prism 303. Specifically, the movement angle denotes a rotation angle of the curved prism 303, and the movement direction is any one of the pitch direction, the yaw direction, and the roll direction.

Accordingly, by using the rotation of the curved prism 303, a phenomenon which the image expressed in the image sensor is blurry can be improved by reducing a light pathway change generated due to shaking of the camera. As illustrated in FIG. 3, a movement amount 305 of the image expressed in the image sensor is nearly eliminated. Therefore, according to the present invention, a blur phenomenon of the image generated due to shaking of the camera can be solved by driving the curved prism 303 using the rotation, and correcting the light pathway change.

For example, when the light pathway change cannot be effectively corrected by driving the curved prism 303, a process of measuring the light pathway change amount by using a feedback control, and driving the curved prism 303 based on the measured light pathway correction amount can be repeatedly performed. Accordingly, the light pathway change amount due to shaking of the camera using the repetitive feedback control is corrected to be nearly eliminated, and a clear image is outputted.

Figure 4:
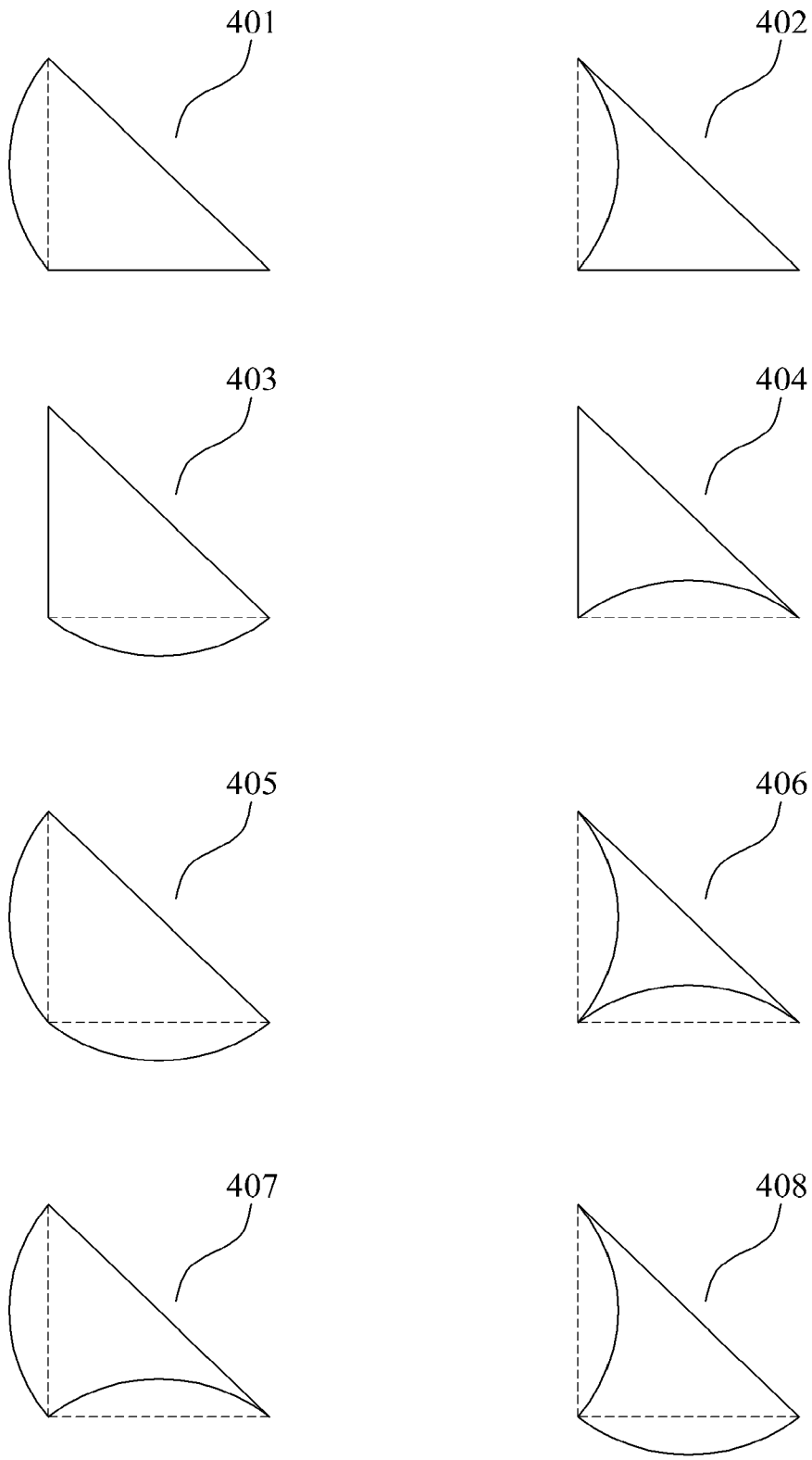
FIG. 4 illustrates an example of a curved prism composed of a refraction surface according to an embodiment of the present invention.

FIG. 4 illustrates an example of a curved prism composed of a refraction surface according to an embodiment of the present invention. For reference, FIG. 4 illustrates a lateral side of the curved prism.

As described above, the curved prism includes an incident surface and an exit surface. When incident light passes through the incident surface of the curved prism, the passed incident light is bent at a 90° angle via a total reflection surface of the curved prism, and is totally reflected. The totally-reflected incident light reaches an image sensor via the exit surface.

Referring to FIG. 4, at least one of an incident surface and an exit surface of the curved prism is composed of a refraction surface. Also, the refraction surface includes a convex surface and a concave surface, and a refractive index of the refraction surface is not limited and is variously established based on a configuration of a system.

Since the convex surface refracts incident light and incident light is converged into a specific focus, the convex surface has a plus refractive index. Conversely, since the concave surface refracts incident light and incident light is diverged away from a point, the concave surface has a minus refractive index.

A curved prism 401, a curved prism 402, a curved prism 403, and a curved prism 404 denote that any one of the incident surface and the exit surface of the curved prism is composed of a refraction surface. The incident surface of the curved prism 401 is composed of a convex surface. The curved prism 402 denotes that the incident surface is composed of a concave surface. The curved prism 403 denotes that the exit surface is composed of a convex surface. The curved prism 404 denotes that the exit surface is composed of a concave surface.

A curved prism 405, a curved prism 406, a curved prism 407, and a curved prism 408 denote that the incident surface and the exit surface are composed of the refraction surface. The curved prism 405 denotes that the incident surface and the exit surface are each composed of a convex surface. The curved prism 406 denotes that the incident surface and the exit surface are each composed of a concave surface. The curved prism 407 denotes that the incident surface is composed of a convex surface and the exit surface is composed of a concave surface. The curved prism 408 denotes that the incident surface is composed of a concave surface and the exit surface is composed of a convex surface.

The curved prisms of FIG. 4 are composed of the refraction surface, and the refractive index can be changed based on a configuration of a camera zoom lens.

Also, while not illustrated in FIG. 4, at least one refraction surface of the incident surface and the exit surface of the curved prism is composed of an aspherical surface according to an embodiment of the present invention. Here, the aspherical surface corresponds to the refraction surface, however, since the aspherical surface is not spherical, the aspherical surface has no curvature.

FIG. 5 illustrates an example of a curved prism connected with an object lens composed of a refraction surface according to an embodiment of the present invention. For reference, FIG. 5 illustrates a lateral side of the curved prism.

Different from FIG. 4, FIG. 5 does not illustrate an example which the curved prism itself is composed of the refraction surface, and illustrates an example of the curved prism which the object lens composed of the refraction surface is connected with. Referring to FIG. 5, the object lens including the refraction surface according to the present embodiment of the present invention is connected with at least one of an incident surface and an exit surface of the curved prism. Here, a refractive index of the object lens is not limited, and is changed based on a configuration of a camera zoom lens.

A curved prism 501, a curved prism 502, a curved prism 503, and a curved prism 504 denote that the object lens including the refraction surface is connected with any one of the incident surface and the exit surface of the curved prism.

The curved prism 501 denotes that the incident surface is connected with a convex lens. The curved prism 502 denotes that the incident surface is connected with a concave lens. The curved prism 503 denotes that the exit surface is connected with a convex lens. The curved prism 504 denotes that the exit surface is connected with a concave lens.

A curved prism 505, a curved prism 506, a curved prism 507, and a curved prism 508 denote that the object lens including the refraction surface is connected with the incident surface and the exit surface.

The curved prism 505 denotes that the incident surface and the exit surface are connected with convex lens. The curved prism 506 denotes that the incident surface and the exit surface are connected with concave lens. The curved prism 507 denotes that the incident surface is connected with a convex lens, and the exit surface is connected with a concave lens. The curved prism 508 denotes that the incident surface is connected with a concave lens, and the exit surface is connected with a convex lens.

Here, since the convex lens is composed of a convex surface, the convex lens has a plus refractive index, and since the concave lens is composed of a concave surface, the concave lens has a minus refractive index. Also, the refractive indexes of the convex lens and the concave lens can be changed based on a configuration of a camera zoom lens.

Accordingly, referring to FIGS. 4 and 5, each of the curved prisms of FIG. 4 is composed of the refraction surface, while each of the curved prisms of FIG. 5 is respectively connected with an object lens composed of the refraction surface. Also, the configurations of the curved prisms are different, however, the curved prisms all similarly perform an object lens function of refracting incident light.

FIG. 6 illustrates an example of a rotation direction for a curved prism 601 according to an embodiment of the present invention.

Referring to FIG. 6, the curved prism 601 is located in a center of coordinates composed of x axis, y axis, and z axis. FIG. 6 illustrates the curved prism 601 of which an exit surface is composed of a convex surface.

The curved prism driving unit 302 of FIG. 3 can drive the curved prism 601 based on a light pathway correction amount determined by the light pathway change amount. Here, the curved prism driving unit 302 can drive the curved prism 601 by rotating the curved prism 601, or moving the curved prism 601 upward and downward, or right and left, or moving the curved prism 601 along an arbitrary curve. A light pathway change due to shaking of a camera can be corrected by driving the curved prism 601.

For example, the curved prism driving unit 302 drives the curved prism 601 in a direction which decreases the light pathway change amount. In this instance, the curved prism driving unit 302 rotates the curved prism 601 in any one of a pitch direction, a yaw direction, and a roll direction.

A graph 602 illustrates a trajectory when the curved prism 601 rotates in the pitch direction. The rotation in the pitch direction denotes that the curved prism 601 rotates in relation to the x axis and the z axis. Specifically, the rotation in the pitch direction denotes that the curved prism 601 rotates upward and downward. For example, the rotation in the pitch direction denotes a rotation which an airplane lifts a front portion of the airplane in order to ascend, or the airplane lowers the front portion of the airplane in order to descend.

A graph 603 illustrates a trajectory when the curved prism 601 rotates in the yaw direction. The rotation in the yaw direction denotes that the curved prism 601 rotates in relation to the x axis and the y axis. Specifically, the rotation in the yaw direction denotes that the curved prism 601 rotates right and left. For example, the rotation in the yaw direction denotes a rotation which controls a movement pathway by rotating an airplane handle to the left or right.

A graph 604 illustrates a trajectory when the curved prism 601 rotates in the roll direction. The rotation in the roll direction denotes that the curved prism 601 rotates in relation to the y axis and the z axis. For example, the rotation in the roll direction denotes the rotation which a ship is shaken right and left due to waves.

Accordingly, when the light pathway of incident light is changed due to shaking of the camera, the curved prism driving unit 302 can drive the curved prism 601 by rotating the curved prism 601 in any one of the pitch direction, the yaw direction, and the roll direction. Accordingly, the changed light pathway is corrected, and the image expressed using the image sensor can be clear.

FIG. 7 is a flowchart illustrating a method of correcting a light pathway according to an embodiment of the present invention.

The method of correcting the light pathway according to the present embodiment of the present invention receives incident light, and a light pathway is changed due to shaking of a camera in operation S701.

The method of correcting the light pathway according to the present embodiment of the present invention measures a light pathway change amount using a movement amount of an image in operation S702.

In this instance, the measuring in operation S702 measures the light pathway change amount by calculating an angular velocity of two axial directions for the image expressed in an image sensor of the camera, and integrating the angular velocity.

Also, the measuring in operation S702 calculates a zoom magnification using location information of a zoom lens included within the camera, and measures the light pathway change amount using the zoom magnification.

In operation S703, the method of correcting the light pathway according to the present embodiment of the present invention determines a light pathway correction amount by the light pathway change amount measured in operation S702.

In this instance, the light pathway correction amount includes a movement angle and a movement direction of the curved prism.

In operation S704, the method of correcting the light pathway according to the present embodiment of the present invention drives a curved prism, composed of a refraction surface, based on the light pathway correction amount determined in operation S703.

The driving in operation S704 drives the curved prism in a direction which decreases the light pathway change amount based on the light pathway correction amount.

The driving in operation S704 rotates the curved prism in any one of a pitch direction, a yaw direction, and a roll direction based on the light pathway correction amount.

In this instance, at least one of an incident surface and an exit surface of the curved prism may be composed of a refraction surface having a curvature.

Also, the incident surface of the curved prism may be composed of any one refraction surface of a convex surface having a plus refractive index and a concave surface having a minus refractive index.

Also, the exit surface of the curved prism may be composed of any one refraction surface of a convex surface having the plus refractive index and a concave surface having the minus refractive index.

Also, at least one of the incident surface and the exit surface of the curved prism may be composed of an aspherical surface.

Also, an object lens including the refraction surface may be connected with at least one of the incident surface and the exit surface of the curved prism.

Also, any one object lens of a convex lens having the plus refractive index and a concave lens having the minus refractive index may be connected with the incident surface of the curved prism.

Also, any one object lens of a convex lens having the plus refractive index and a concave lens having the minus refractive index may be connected with the exit surface of the curved prism.

Also, the object lens including the refraction surface may be an aspherical surface connected with at least one of the incident surface and the exit surface of the curved prism.

The method of correcting the light pathway according to the present embodiment of the present invention corrects the light pathway by driving the curved prism in operation S705.

The method of correcting the light pathway according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, there may be provided a method and system for correcting a light pathway which can correct a light pathway change generated due to shaking of a camera by driving a curved prism composed of a refraction surface.

According to the present invention, there may be provided a method and system for correcting a light pathway which can easily compensate for arbitrary shaking of a camera by driving a curved prism composed of a refraction surface using various methods.

According to the present invention, there may be provided a method and system for correcting a light pathway which can eliminate a need for increasing a length and a thickness of a zoom lens barrel caused by adding parts by composing a curved prism of a refraction surface performing an object lens function.

According to the present invention, there may be provided a method and system for correcting a light pathway which can eliminate various shakings of a camera by driving a curved prism composed of various refraction surfaces.

According to the present invention, there may be provided a method and system for correcting a light pathway by driving a curved prism composed of a refraction surface which can reduce an assembling error of an additional optical apparatus needed for the correcting of the light pathway.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A system for correcting a light pathway, the system comprising:
  a light pathway change amount measurement unit to measure a light pathway change amount using a movement amount of an image when a light pathway of incident light is changed due to shaking of a camera; and
  a curved prism driving unit to drive a curved prism, composed of a refraction surface, based on a light pathway correction amount determined by the light pathway change amount,
  wherein one of an incident surface and an exit surface of the curved prism is composed of a refraction surface having a curvature, and the other is composed of an aspherical surface, and
  wherein the curved prism driving unit rotates the curved prism based on the light pathway correction amount.

2. The system of claim 1, wherein the incident surface of the curved prism is composed of any one refraction surface of a convex surface having a plus refractive index and a concave surface having a minus refractive index.

3. The system of claim 1, wherein the exit surface of the curved prism is composed of any one refraction surface of a convex surface having a plus refractive index and a concave surface having a minus refractive index.

4. The system of claim 1, further comprising an object lens connected with at least one of an incident surface and an exit surface of the curved prism.

5. The system of claim 4, wherein any one object lens of a convex lens having a plus refractive index and a concave lens having a minus refractive index is connected with the incident surface of the curved prism.

6. The system of claim 4, wherein any one object lens of a convex lens having a plus refractive index and a concave lens having a minus refractive index is connected with the exit surface of the curved prism.

7. The system of claim 4, wherein the object lens has an aspherical surface.

8. The system of claim 1, wherein the light pathway change amount measurement unit measures the light pathway change amount by calculating an angular velocity of two axial directions for the image expressed in an image sensor of a camera, and integrating the angular velocity.

9. The system of claim 1, wherein the light pathway change amount measurement unit calculates a zoom magnification using location information of a zoom lens included within the camera, and measures the light pathway change amount using the zoom magnification.

10. The system of claim 1, wherein the curved prism driving unit drives the curved prism in a direction which decreases the light pathway change amount based on the light pathway correction amount.

11. The system of claim 10, wherein the curved prism driving unit rotates the curved prism in any one of a pitch direction, a yaw direction, and a roll direction based on the light pathway correction amount.

12. The system of claim 1, wherein the light pathway correction amount includes a movement angle and a movement direction of the curved prism.

13. A method of correcting a light pathway, the method comprising:
measuring a light pathway change amount using a movement amount of an image when a light pathway of incident light is changed due to shaking of a camera; and
driving a curved prism, composed of a refraction surface, based on a light pathway correction amount determined by the light pathway change amount,
wherein the driving rotates the curved prism based on the light pathway correction amount, and
wherein one of an incident surface and an exit surface of the curved prism is composed of a refraction surface having a curvature, and the other is composed of an aspherical surface.

14. The method of claim 13, wherein at least one of an incident surface and an exit surface of the curved prism is composed of a refraction surface having a curvature, and the refraction surface is any one refraction surface of a convex surface having a plus refractive index and a concave surface having a minus refractive index.

15. The method of claim 13, wherein at least one of an incident surface and an exit surface of the curved prism is composed of an aspherical surface.

16. The method of claim 13, wherein an object lens is connected with at least one of an incident surface and an exit surface of the curved prism.

17. The method of claim 16, wherein any one object lens of a convex lens having a plus refractive index and a concave lens having a minus refractive index is connected with the incident surface of the curved prism.

18. The method of claim 13, wherein the measuring calculates a zoom magnification using location information of a zoom lens included within the camera, and measures the light pathway change amount using the zoom magnification.

19. The method of claim 13, wherein the driving drives the curved prism in a direction which decreases the light pathway change amount based on the light pathway correction amount.

20. The method of claim 19, wherein the driving rotates the curved prism in any one of a pitch direction, a yaw direction, and a roll direction based on the light pathway correction amount.

* * * * *